Jan. 5, 1960 K. SPOHN 2,919,593
MACHINE TOOL TRANSMISSION
Filed Feb. 20, 1958 4 Sheets-Sheet 2

Inventor
Karl Spohn
By Michael S. Striker
Attorney

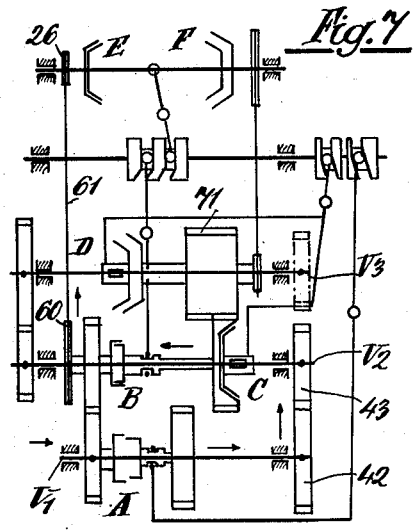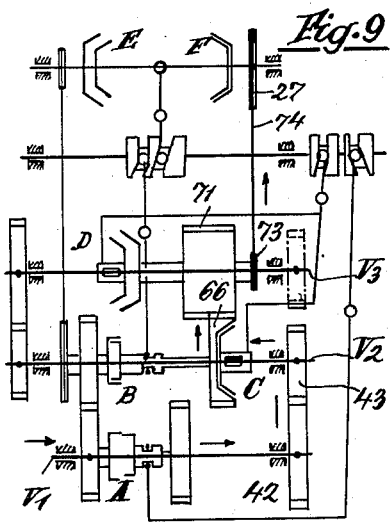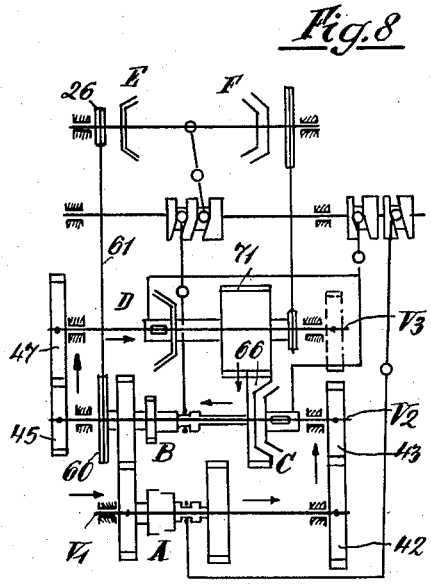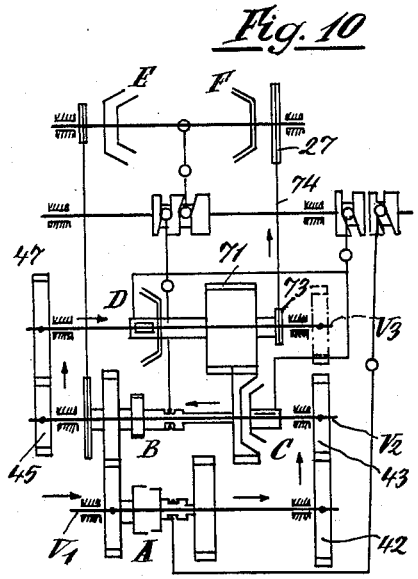

Jan. 5, 1960 K. SPOHN 2,919,593
MACHINE TOOL TRANSMISSION
Filed Feb. 20, 1958 4 Sheets-Sheet 4

Inventor
Karl Spohn
By Michael S. Striker
Attorney

United States Patent Office 2,919,593
Patented Jan. 5, 1960

2,919,593

MACHINE TOOL TRANSMISSION

Karl Spohn, Oberesslingen (Neckar), Germany, assignor to Firma Index-Werke K.G. Hahn & Tessky, Esslingen, (Neckar), Germany Application February 20, 1958, Serial No. 716,465

Claims priority, application Germany February 22, 1957

8 Claims. (Cl. 74—337.5)

The present invention relates to transmissions, and more particularly to transmissions suitable for use in machine tools such as lathes and the like.

With such machine tools it is very often desirable to be able to rotate the drive spindle at several different speeds in one direction as well as more than one speed in an opposite direction, and at the present time it is not possible to obtain the desired variety of speeds of rotation of the spindle with a simple practical construction.

One of the objects of the present invention is to provide a relatively simple efficient transmission capable of providing the desired variety of speeds in different directions of the spindle of a machine tool or the like.

A further object of the present invention is to provide a structure of the above type which can only be operated in such way that there can be no conflict between the several components of the transmission.

With the above objects in view the present invention includes in a machine tool a first rotary member rotatable about a first axis and second and third rotary members respectively rotatable about said second and third parallel axes which are parallel to the first axis, the second and third rotary members being in driving engagement with the first rotary member to rotate therewith at speeds having, respectively, predetermined ratios to the speed of rotation of the first rotary member. First and second driven clutch members are respectively connected with the first and second rotary members to rotate therewith, and first and second driving clutch members are coaxial with the first and second driven clutch members, respectively, and are axially shiftable with respect thereto between engaged and disengaged positions. A means cooperates with the first and second driving clutch members to rotate the latter at speeds having a predetermined ratio with respect to each other, and a means cooperates with the first and second driving clutch members for placing only one or the other of the same in its engaged position at one time. A third driving clutch member is coaxially connected to the third rotary member for rotation therewith and for axial movement with respect thereto between engaged and disengaged positions, and a fourth driving clutch member is connected with the second driven clutch member for rotation therewith and for axial shifting movement with respect thereto between engaged and disengaged positions. Third and fourth driven clutch members are respectively coaxial with the third and fourth driving clutch members to be respectively driven by the latter when said third and fourth driving clutch members are in their engaged positions, and a means cooperates with the third and fourth driving clutch members for placing only one or the other of the latter driving clutch members in its engaged position at one time. A motion transmitting means cooperates with the third and fourth driven clutch members to transmit rotation therebetween and to maintain the rotary speeds thereof at a fixed predetermined ratio. The machine tool includes a spindle, and a first drive means cooperates with one of the abovementioned three rotary members for transmitting a drive therefrom to this spindle, while a second drive means cooperates with one of the third and fourth driven clutch members to transmit a drive therefrom to the spindle. A means is provided for selectively placing the spindle in driving connection with one or the other of the first and second drive means.

The novel features which are considered as characteristic for the invention are set forth in particular in the appended claims. The invention itself, however, both as to its construction and its method of operation, together with additional objects and advantages thereof, will be best understod from the following description of specific embodiments when read in connection with the accompanying drawings, in which:

Figure 11:
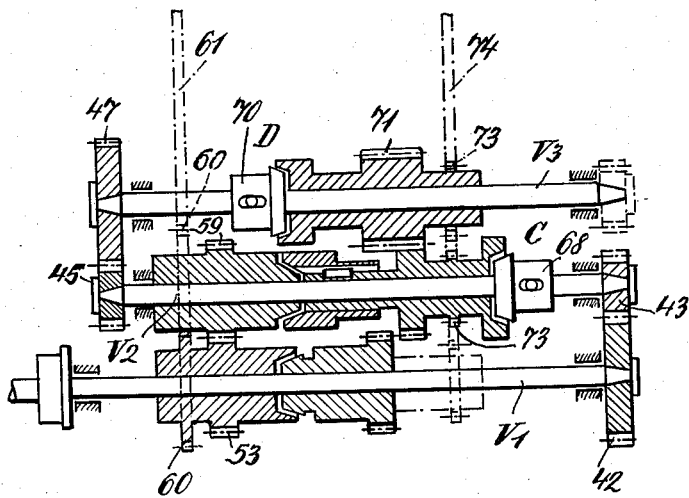

Figs. 3–10 respectively illustrate schematically different operating positions of the structure of the invention; and Fig. 11 is a schematic view of the transmission of the invention developed into the plane of Fig. 11 and showing several possible variations in the transmission.

Figures 1, 2:
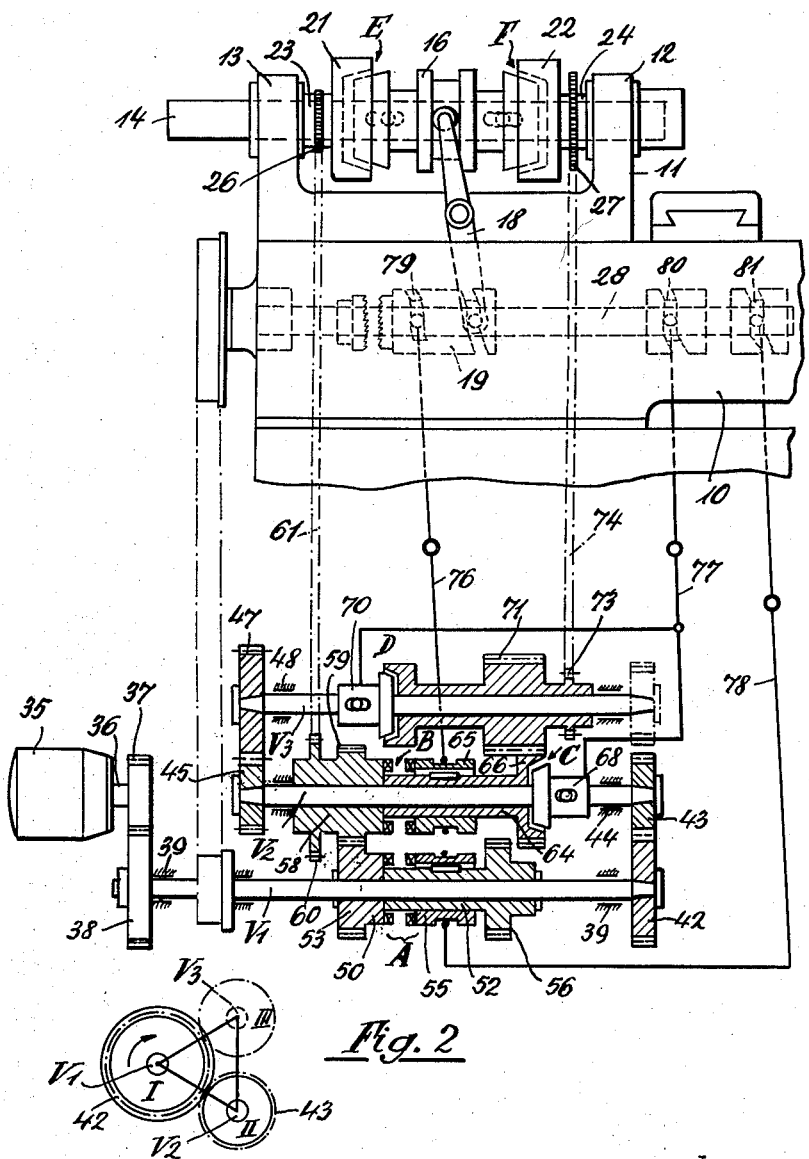
Fig. 1 is a partly sectional, partly schematic, elevational view of an assembly according to the present invention with the transmission of the invention developed into the plane of Fig. 1 for the sake of clarity.
Fig. 2 is a diagrammatic transverse view taken in a plane normal to the axes of the shafts of the transmission of Fig. 1 and showing the actual position of these shafts with respect to each other.

Referring now to Fig. 1, there is fragmentarily illustrated therein a machine tool which includes a base 10 carrying a bearing block 11 provided with the coaxial bearings 12 and 13 for the rotary spindle 14 of the machine tool. The machine tool, for example, may be an automatic lathe.

A sleeve 16 is axially shiftable along the spindle 14 between the bearings 12 and 13 and is constrained to rotate with the spindle 14, and this sleeve 16 is axially shifted between opposed end positions by a lever 18 pivotally supported intermediate its ends, carrying at one end a roller located in an annular groove of sleeve 16, and carrying at its opposite end a follower located in a cam groove of a cam 19. This cam 19 is carried by a rotary cam shaft 20.

The opposite ends of the sleeve 16 respectively fixedly carry driven clutch members of a pair of clutches E and F. These driven clutch members respectively cooperate with coaxial driving clutch members 21 and 22 which are freely turnable on the spindle 14 and which are respectively connected with hubs 23 and 24 freely turnable on the spindle 14. These hubs respectively fixedly carry sprocket wheels 26 and 27 which respectively cooperate with chains 61 and 74 of drives extending from the transmission of the invention to the clutches E and F so that the shifting of the sleeve 16 enables the spindle 14 to be placed selectively in driving engagement with one or the other of these drives. The driving clutch members 21 and 22, while freely turnable with respect to the shaft 14 are prevented from axially shifting thereon.

The transmission of the invention may receive its power from a driving motor 35 whose drive shaft 36 fixedly carries gear 37 which meshes with gear 38 which is fixed to the rotary transmission shaft $V_1$ which is supported for rotation by bearings 39. At its right end, as viewed in Fig. 1, the shaft $V_1$ fixedly carries a gear 42 which meshes with a gear 43 fixed to a rotary transmission shaft $V_2$ which is parallel to the shaft $V_1$ and which is supported for rotation by bearings 44. At its end distant from gear 43 the shaft $V_2$ fixedly carries a gear 45 which meshes with a gear 47 fixed to one end of a third shaft $V_3$ parallel to the shafts $V_1$ and $V_2$. Thus, as long as the motor 35 operates the several shafts $V_1$—$V_3$ will continuously rotate at speeds which have a fixed predetermined ratio with respect to each other. While these shafts and the parts connected thereto and carried thereby are shown in Fig. 1 as located one above the other, this is only a developed view presented to illustrate clearly the structure of the invention. Actually, these shafts are arranged as indicated in Fig. 2 in such a way that there is an equilateral triangle having its corners located respectively at those points in a plane normal to the shafts through which their axes respectively pass. Thus, the gear 43 may be removably connected to the shaft $V_2$ so as to be optionally placed on the shaft $V_3$, as shown in dot-dash lines in Figs. 1 and 2, so that in this case the drive would be transmitted from shaft $V_1$ through gears 42 and 43 to the shaft $V_3$ and then from the latter through gears 47 and 45 to the shaft $V_2$.

A rotary member 71 is freely turnable on the shaft $V_3$ and meshes with a second rotary member 64 which is freely turnable on the shaft $V_2$ and with a third rotary member 56 which is freely turnable on the shaft $V_1$, so that these three rotary members rotate with respect to each other at speeds which have fixed predetermined ratios with respect to each other. A driven clutch member of a clutch D is connected with rotary member 71 for rotation therewith and a driven clutch member 66 of a clutch C is connected with the rotary member 64 for rotation therewith. Driving clutch members 68 and 70 of the clutches C and D, respectively, are axially shiftable on the shafts $V_2$ and $V_3$, respectively, while constrained to rotate therewith between engaged positions respectively engaging the driven clutch members of clutches C and D and disengaged positions respectively spaced from the driven clutch members of the clutches C and D, respectively. Thus, it will be seen that the drive from the motor 35 is actually transmitted directly to the driving clutch members 68 and 70 which are constrained to rotate at speeds which have with respect to each other a ratio determined by the gears 45 and 47. These driving clutch members 68 and 70 are controlled by a linkage 77 actuated by a cam 80 on shaft 20 in such a way that only one of the clutches C and D is in its engaged position at one time.

The rotary member 64 carries a driving clutch member 65 of a clutch B, the clutch member 65 being constrained to rotate with rotary member 64 while being axially shiftable with respect thereto between engaged and disengaged positions. The rotary member 56, which meshes with rotary member 71, has an elongated hub portion 52 carrying a driving clutch member 55 of a clutch A, this clutch member 55 being axially shiftable on the elongated hub 52 while constrained to rotate therewith. Driven clutch members 58 and 53 of the clutches B and A, respectively, are freely turnable on shafts $V_2$ and $V_1$, respectively, while prevented from shifting axially thereon, and the driving clutch members 65 and 55 are shiftable from their disengaged positions shown in Fig. 1 to engaged positions engaging the driven clutch members 58 and 53 to rotate the latter. The position of driving clutch member 65 is controlled by lever 76 which is actuated by cam 79 carried by shaft 20, and the position of driving clutch member 55 is controlled by linkage 78 which is actuated by cam 81 carried by the shaft 20, and the cams 79 and 81 operate in such a way that only one of the clutches A and B is engaged at any one time.

In the example of Fig. 1, the sprocket chain 74 which cooperates with the sprocket wheel 27 is driven from a sprocket wheel 73 connected to rotary member 71. Also, the sprocket chain 61 is driven from a sprocket wheel 60 which rotates with the driven clutch member 58. It should be noted that the driven clutch member 53 of clutch A has a gear portion 50 which meshes with a gear portion 59 of the driven clutch member 58 so that these driven clutch members are constrained to rotate at speeds which have a fixed predetermined ratio with respect to each other.

With the clutch D engaged and clutch C disengaged, the drive will be transmitted from the motor 35 to the rotary member 71 so that the chain 74 will be driven to rotate the driving clutch member 22 of clutch F. The clutch B and rotary member 64 serve as one combined clutch and transmission means for rotating the rotary member 58 at one speed with respect to the speed of rotary member 71, while the rotary member 56 and clutch A, serve as another combined clutch and transmission means for rotating the member 58 at a different speed with respect to member 71, and thus depending upon whether clutch A or clutch B is engaged simultaneously with clutch D, the chain 61 will be driven at a selected one of two speeds which are different from the speed of chain 74, so that by selectively engaging clutches E or F the spindle 14 can be driven at a selected speed.

When the clutch C is engaged and the clutch D disengaged, the rotary member 71 will be driven from clutch member 66 to drive the chain 74, while the rotary member 58 will be driven at one speed, which is the same as that of clutch C, if clutch B is engaged and at a different speed through elements 66, 71, 56 when clutch A is engaged, so that the chain 61 will be driven at one of these two speeds depending upon whether clutch A or clutch B is engaged simultaneously with clutch C, and here again the selective engagement of clutch E will provide the spindle 14 with one of two speeds depending on whether clutch A or clutch B is engaged, while the engagement of clutch F will drive the spindle 14 with the speed determined by chain 74.

As is indicated in Fig. 11, variations in the drive are possible by connecting the chain 74 to a sprocket wheel 73 carried by rotary member 64 rather than rotary member 71 or by connecting the chain 74 with a sprocket wheel 73 fixed to an extension of the rotary member 56, and the sprocket wheel 60 can be connected to driven clutch 53 instead of driven clutch member 58, to provide further variations. As was pointed out above it is also possible to mount gear 43 on shaft $V_3$ instead of $V_2$.

The cam shaft 20 may be placed in any selected one of a plurality of angular positions to place the clutches in their engaged or disengaged positions as described above, or a drive may be taken in a known way from the shaft $V_1$ and transmitted to the shaft 20 for placing the latter in a selected one of the plurality of angular positions.

Figs. 3–10 illustrate various positions of the structure of the invention, and the arrows in these figures indicate the transmission of the drive.

Figure 3:
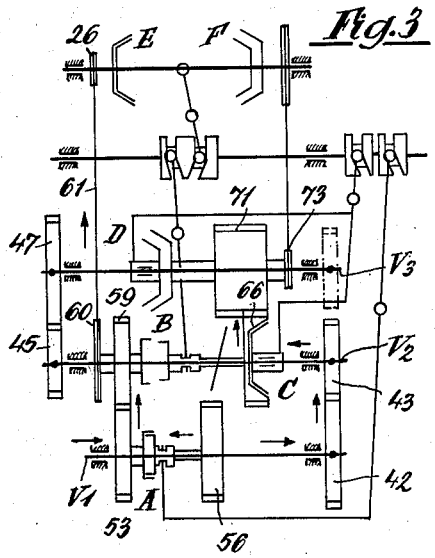

In Fig. 3 clutches E, C, and A are engaged, while clutches F, D and B are disengaged. Thus, the drive is $V_1$, 42, 43, C, 66, 71, 56, A, 53, 59, 60, 61, 26, and the spindle 14 is driven without being influenced by gears 45 and 47 through the chain 61.

Figure 4:
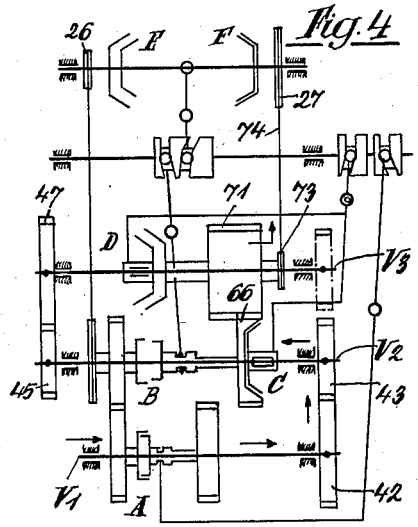

Fig. 4 differs from Fig. 3 only in that clutch F is engaged while clutch E is now disengaged, and the drive is $V_1$, 42, 43, C, 66, 71, 73, 74, 27, so that there is a direct drive through the chain 74 to the spindle 14.

Figure 5:
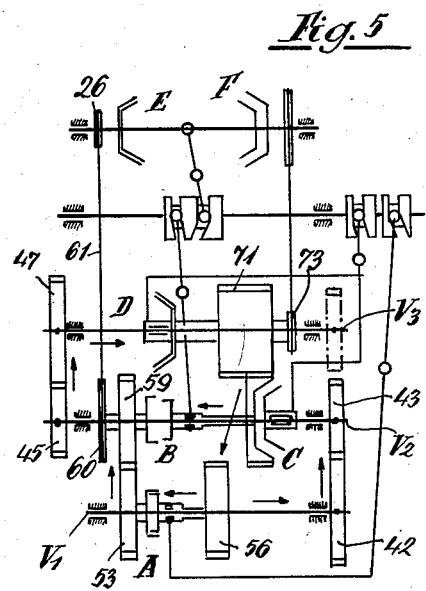

In Fig. 5 clutches E, D and A are engaged, and the drive is $V_1$, 42, 43, $V_2$, 45, 47, $V_3$, D, 71, 56, A, 53, 59, 60, 61, 26, so that the spindle 14 is driven through the chain 61 with the gears 45 and 47 located in the drive.

Figure 6:
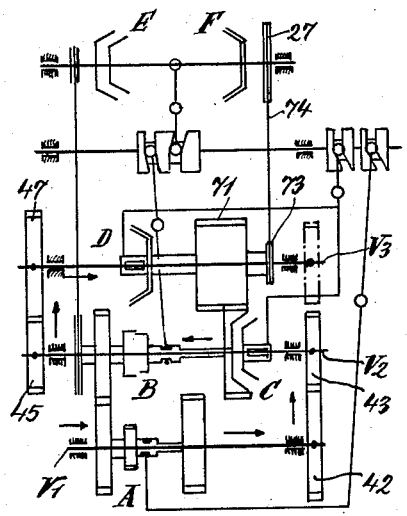

In Fig. 6, the parts have the same position as in Fig. 5 except that the clutch F is engaged while clutch E is disengaged, and the drive is $V_1$, 42, 43, $V_2$, 45, 47, $V_3$, D, 73, 74, 27, so that in this case the spindle 14 is driven through the chain 74 with the gears 45 and 47 also located in the drive.

In Fig. 7, the clutches B, C and E are engaged, the clutches F, D, and A therefore being disengaged, and the drive is $V_1$, 42, 43, $V_2$, C, B, 60, 61, 26. Thus there is a direct drive without gears 45 and 47.

In Fig. 8, the parts have the same position as in Fig. 7 except that the clutch D is engaged and the clutch C is disengaged. Now the drive is $V_1$, 42, 43, $V_2$, 45, 47, $V_3$, D, 71, 66, B, 60, 61, 26, and now the drive to the spindle 14 through chain 61 includes the gears 45 and 47.

In Fig. 9, the parts have the same position as in Fig. 7 except that the clutch F is engaged while the clutch E is disengaged, and the drive is $V_1$, 42, 43, $V_2$, C, 66, 71, 73, 74, 27.

In Fig. 10, the parts have the same position as in Fig. 8 except that clutch F is engaged while clutch E is disengaged, and the transmission is $V_1$, 42, 43, $V_2$, 45, 47, $V_3$, D, 73, 74, 27.

The reversal in the direction of rotation of the spindle in all of the above cases can be obtained simply by shifting the gear 43 from the shaft $V_2$ to the shaft $V_3$.

It is apparent from the above description that with the structure of the invention a total of six different speeds as shown in Fig. 11, the number of possible connections and speeds does not change.

In the accompanying table the different connection possibilties are shown, and an X under a particular clutch in the clutch columns indicates that this clutch is engaged. The chain drives are indicated by I and II for the chains 61 and 74, as indicated above, and the term "left" indicates one direction of rotation of the spindle 14 while the term "right" indicates the opposite direction of rotation. Moreover, the table indicates to which of the shafts the sprocket wheels are shifted. Thus, I, $V_2$ indicates that the chain 61 is connected with sprocket wheel 60 which is fixed to the driven clutch member 58, while I, $V_1$ indicates that the sprocket wheel 60 is connected with rotary member 53 (Fig. 11). The symbol II, $V_3$ shows the arrangement of Fig. 1 where sprocket wheel 73 is connected to rotary member 71, while II, $V_2$ indicates an arrangement where sprocket wheel 73 is connected with rotary member 64 (Fig. 11) and II, $V_1$ indicates that sprocket wheel 73 is connected with rotary member 56 (Fig. 11).

| Engaged Clutches | | | | | | Chain I | | Chain II | | Speeds of Rotation | | | | | | | | | | | |
|---|---|---|---|---|---|---|---|---|---|---|---|---|---|---|---|---|---|---|---|---|---|
| | | | | | | | | | | I,$V_2$ II,$V_3$ | | I,$V_2$ II,$V_2$ | | I,$V_2$ II,$V_1$ | | I,$V_1$ II,$V_3$ | | I,$V_1$ II,$V_2$ | | I,$V_1$ II,$V_1$ | |
| A | B | C | D | E | F | direct | through 45, 47 | direct | through 45, 47 | left | right | left | right | left | right | left | right | left | right | left | right |
| X | -- | X | -- | X | -- | X | ------ | ------ | ------ | $n_1$ | ---- | $n_1$ | ---- | $n_1$ | ---- | ---- | $n_1$ | ---- | $n_1$ | ---- | $n_1$ |
| X | ---- | X | -- | -- | X | ---- | ---- | X | ---- | $n_2$ | ---- | ---- | $n_2$ | ---- | $n_2$ | $n_2$ | ---- | ---- | $n_2$ | ---- | $n_2$ |
| X | ---- | -- | X | X | -- | ---- | X | ---- | ---- | $n_3$ | ---- | $n_3$ | ---- | $n_3$ | ---- | ---- | $n_3$ | ---- | $n_3$ | ---- | $n_3$ |
| X | ---- | -- | X | -- | X | ---- | ---- | ---- | X | $n_4$ | ---- | ---- | $n_4$ | ---- | $n_4$ | $n_4$ | ---- | -- - | $n_4$ | ---- | $n_4$ |
| ---- | X | X | -- | X | -- | X | ---- | ---- | ---- | ---- | $n_5$ | ---- | $n_5$ | ---- | $n_5$ | $n_5$ | ---- | $n_5$ | ---- | $n_5$ | ---- |
| ---- | X | -- | X | X | -- | -- - | X | ---- | ---- | ---- | $n_6$ | ---- | $n_6$ | -- - | $n_6$ | $n_6$ | ---- | $n_6$ | ---- | $n_6$ | ---- |
| ---- | X | X | -- | -- | X | ---- | ---- | X | ---- | $n_2$ | ---- | ---- | $n_2$ | ---- | $n_2$ | $n_2$ | ---- | -- - | $n_2$ | ---- | $n_2$ |
| ---- | X | -- | X | -- | X | ---- | ---- | ---- | X | $n_4$ | ---- | ---- | $n_4$ | ---- | $n_4$ | $n_4$ | ---- | ---- | $n_4$ | ---- | $n_4$ | may be provided four of which are in one direction and two in the opposite direction. If it is assumed that the chain drives 61 and 74, indicated in their entirety as I and II in the accompanying table, have with respect to each other a transmission ratio of 2:1, and the gears 45 and 47 have a ratio of 1:1.5, while it is further assumed that the speed of rotation $n_1$ of the transmission when it has the position shown in Fig. 3, which is to say the speed of rotation $n_1$ of the spindle 14, is equal to Q revolutions per minute, then the speed of the spindle with the arrangement of Fig. 4 will be $n_2 = Q/2$, the connection of Fig. 5 gives $n_3 = Q/1.5$, and the connection of Fig. 6 gives $n_4 = Q/2 \times 1.5$. These four speeds of rotation in the same direction are related in the following manner:

$$Q : Q/2 = Q/1.5 : Q/2 \times 1.5$$

or $$n_1 : n_2 : n_3 : n_4 = 6 : 3 : 4 : 2$$

From similar considerations it follows that the speeds in the opposite direction according to Figs. 7 and 8 have the following relationship:

$$n_5 : n_6 = 6 : 4$$

If it is desired to stop the rotation of the spindle while the driving motor 35 continues to operate, then the cams 79 and 81 may be operated in this case to cause the clutches A and B to become engaged at the same time, and the cam 80 is placed in the position which causes the clutches C and D to be opened at the same time, so that the three shafts $V_1$, $V_2$ and $V_3$ rotate freely without being capable of transmitting a drive to either of the chains 61 or 74.

It should be noted that when the sprocket wheels 60 and 73 are at locations different than that of Fig. 1, It will be understood that each of the elements described above, or two or more together, may also find a useful application in other types of transmissions differing from the types described above.

While the invention has been illustrated and described as embodied in machine tool transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, first and second parallel rotary transmission shafts; means operatively connected with said shafts for driving the latter respectively at speeds having a fixed predetermined ratio with respect to each other when the machine tool operates; first and second driving clutch members respectively carried by said first and second shafts for rotation therewith and for axial movement with respect thereto between clutch engaged and clutch disengaged positions; first and second driven clutch members freely turnable on said first and second shafts, respectively, and cooperating with said first and second driving clutch members to be rotated when the latter are in said engaged positions thereof;

operating means cooperating with said first and second driving clutch members to place only one or the other of said driving clutch members in its engaged position at one time; transmission means cooperating with said first and second driven clutch members to transmit rotation between said driven clutch members and for maintaining the rotary speeds thereof at a fixed predetermined ratio; a drive spindle; and means for transmitting a drive from one of said driven clutch members to said spindle.

2. In a machine tool, in combination, first and second parallel rotary transmission shafts; means operatively connected with said shafts for driving the latter respectively at speeds having a fixed predetermined ratio with respect to each other when the machine tool operates; first and second driving clutch members respectively carried by said first and second shafts for rotation therewith and for axial movement with respect thereto between clutch engaged and clutch disengaged positions; first and second driven clutch members freely turnable on said first and second shafts, respectively, and cooperating with said first and second driving clutch members to be rotated when the latter are in said engaged positions thereof; operating means cooperating with said first and second driving clutch members to place only one or the other of said driving clutch members in its engaged position at one time; transmission means cooperating with said first and second driven clutch members to transmit rotation between said driven clutch members and for maintaining the rotary speeds thereof at a fixed predetermined ratio; a driven spindle; means for transmitting a drive from one of said driven clutch members to said spindle; a third driving clutch member connected with the other of said driven clutch members for rotation therewith and for axial movement with respect thereto between clutch engaged and clutch disengaged positions; a third driven clutch member freely turnable on the shaft which carries said other driven clutch member to be driven by said third driving clutch member when the latter is in its engaged position; means for transmitting a drive from said third driven clutch member to said spindle; and means for selectively driving said spindle either with the drive from said third driven clutch member or with the drive from said one of said first and second driven clutch members.

3. In a machine tool, in combination, first and second parallel rotary transmission shafts; means operatively connected with said shafts for driving the latter respectively at speeds having a fixed predetermined ratio with respect to each other when the machine tool operates; first and second driving clutch members respectively carried by said first and second shafts for rotation therewith and for axial movement with respect thereto between clutch engaged and clutch disengaged positions; first and second driven clutch members freely turnable on said first and second shafts, respectively, and cooperating with said first and second driving clutch members to be rotated when the latter are in said engaged positions thereof; operating means cooperating with said first and second driving clutch members to place only one or the other of said driving clutch members in its engaged position at one time; transmission means cooperating with said first and second driven clutch members to transmit rotation between said driven clutch members and for maintaining the rotary speeds thereof at a fixed predetermined ratio; a drive spindle; means for transmitting a drive from one of said driven clutch members to said spindle; a third driving clutch member connected with the other of said driven clutch members for rotation therewith and for axial movement with respect thereto between clutch engaged and clutch disengaged positions, a third driven clutch member freely turnable on the shaft which carries said other driven clutch member to be driven by said third driving clutch member when the latter is in its engaged position; means for transmitting a drive from said third driven clutch member to said spindle; means for selectively driving said spindle either with the drive from said third driven clutch member or with the drive from said one of said first and second driven clutch members; combined clutch and transmission means cooperating with said one of said first and second driven clutch members and said third driven clutch member for rotating the latter, when said one driven clutch member rotates at a given speed, at a speed different from the speed of rotation of said other of said first and second driven clutch members at said given speed of said one driven clutch member; and control means cooperating with said third driving clutch member and said combined clutch and transmission means for placing the latter in an engaged position driving said third driven clutch member only when said third driving clutch member is in its disengaged position and for placing said combined clutch and transmission means in a disengaged position incapable of transmitting a drive from said one to said third driven clutch member when said third driving clutch member is in its engaged position.

4. In a machine tool, in combination, a first rotary member rotatable about a first axis; second and third rotary members respectively rotatable about second and third parallel axes which are parallel to said first axis, said second and third members being in driving engagement with said first member to rotate therewith at speeds having, respectively, predetermined ratios to the speed of rotation of said first member; first and second driven clutch members connected respectively with said first and second rotary members for rotation therewith; first and second driving clutch members coaxial with said first and second driven clutch members, respectively, and axially shiftable with respect thereto between engaged and disengaged positions; means cooperating with said first and second driving clutch members for rotating the latter at speeds having a predetermined ratio with respect to each other; means cooperating with said first and second driving clutch members for placing only one or the other of the latter clutch members in its engaged position at one time; a third driving clutch member connected coaxially to said third rotary member for rotation therewith and for axial movement with respect thereto between engaged and disengaged positions; a fourth driving clutch member connected with said second driven clutch member for rotation therewith and for axial shifting movement with respect thereto between engaged and disengaged positions; third and fourth driven clutch members respectively coaxial with said third and fourth driving clutch members to be respectively driven by the latter when said third and fourth driving clutch members are in their engaged positions; means cooperating with said third and fourth driving clutch members for placing only one or the other of said third and fourth driving clutch members in its engaged position at one time; motion transmitting means cooperating with said third and fourth driven clutch members for transmitting rotation therebetween and maintaining the rotary speeds thereof at a fixed predetermined ratio; a spindle; first drive means cooperating with one of said rotary members for transmitting a drive therefrom to said spindle; second drive means cooperating with one of said third and fourth driven clutch members for transmitting a drive therefrom to said spindle and means for selectively placing said spindle in driving connection with one or the other of said drive means.

5. In a machine tool as recited in claim 4, the three parallel axes of said first, second and third rotary members passing through a plane normal to said axes at the corners of an equilateral triangle located in said plane.

6. In a machine tool as recited in claim 4, first, second and third shafts respectively extended along said axes of said three rotary members and supporting the latter for rotation, said first and second driving clutch members being connected to said first and second shafts for rotation therewith and axial movement therealong and the means for rotating said first and second driving clutch members including said first and second shafts, a drive transmission extending between and cooperating with said first and second shafts to maintain said speed ratio between said first and second driving clutch members, a drive connected to said third shaft for driving the latter, and a drive transmission extending between said third shaft and one of said first and second shafts for rotating the latter at a speed having a predetermined ratio to the speed of said third shaft.

7. In a machine tool as recited in claim 4, means for placing said third and fourth driving clutch members simultaneously in their engaged positions and said first and second driving clutch members simultaneously in their disengaged positions to prevent a transmission of a drive to said spindle.

8. In a machine tool, in combination, a rotary spindle; a pair of drives operatively connected with said spindle for respectively rotating the same in different directions; means cooperating with said drives and said spindle for optionally placing the latter in driving engagement with one or the other of said drives; first transmission means having two different speed positions and operatively connected with one of said drives for operating the latter at one speed when said first transmission means is in one of its speed positions and at another speed when said first transmission means is in the other of its speed positions; and second transmission means also having two different speed positions, said second transmission means being operatively connected to the other of said drives for driving the latter and said second transmission means being operatively connected to and driven by said first transmission means at two different speeds when said first transmission means is respectively in its different speed positions, whereby said other drive may be driven at a selected one of four different speeds by combining a selected one of the two speed positions of said second transmission means with a selected one of the two speed positions of said first transmission means.

References Cited in the file of this patent

UNITED STATES PATENTS

| 781,265 | Brown | Jan. 31, 1905 |
| 800,238 | Owen | Sept. 26, 1905 |
| 2,237,183 | Jelinek et al. | Apr. 1, 1941 |
| 2,804,780 | Gerst | Sept. 3, 1957 |

FOREIGN PATENTS

| 442,820 | Great Britain | Feb. 17, 1936 |
| 535,282 | Great Britain | Apr. 3, 1941 |